Figure 3:
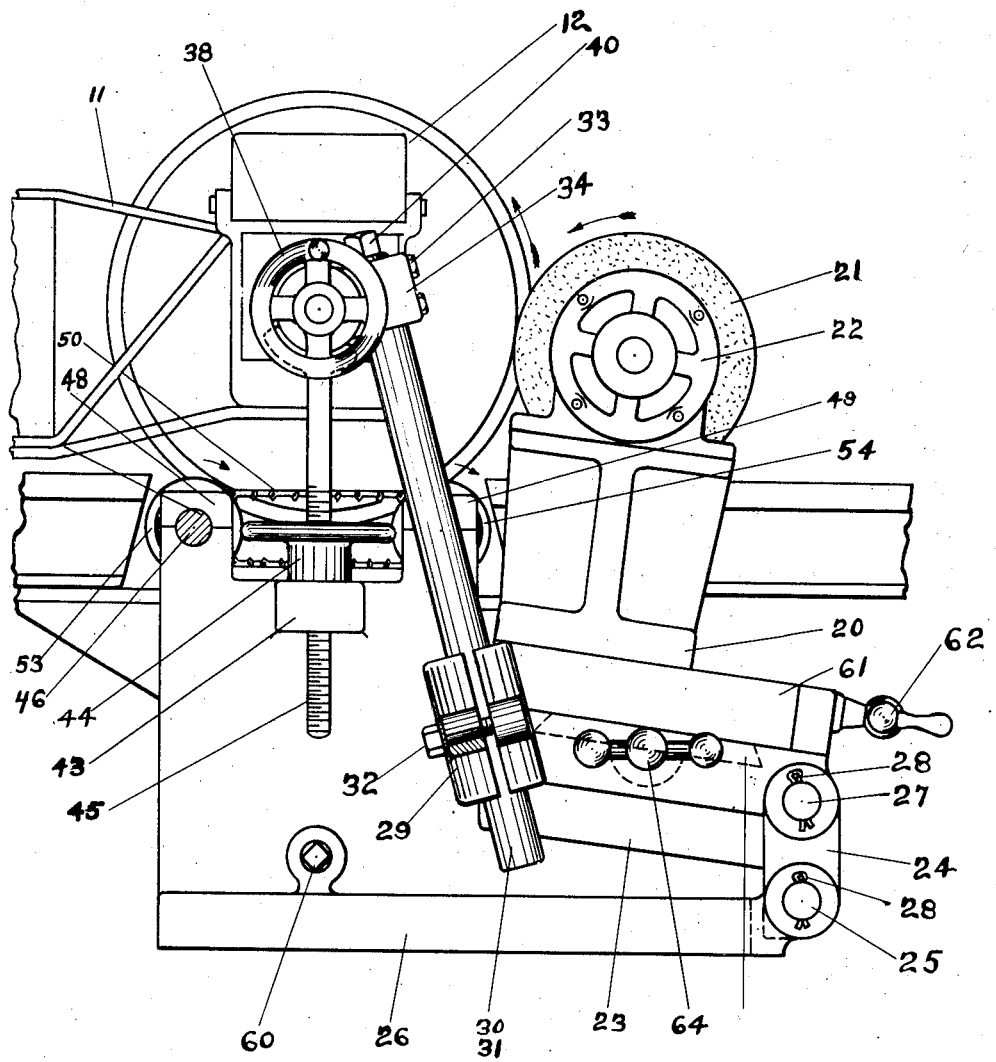
Figure 4:
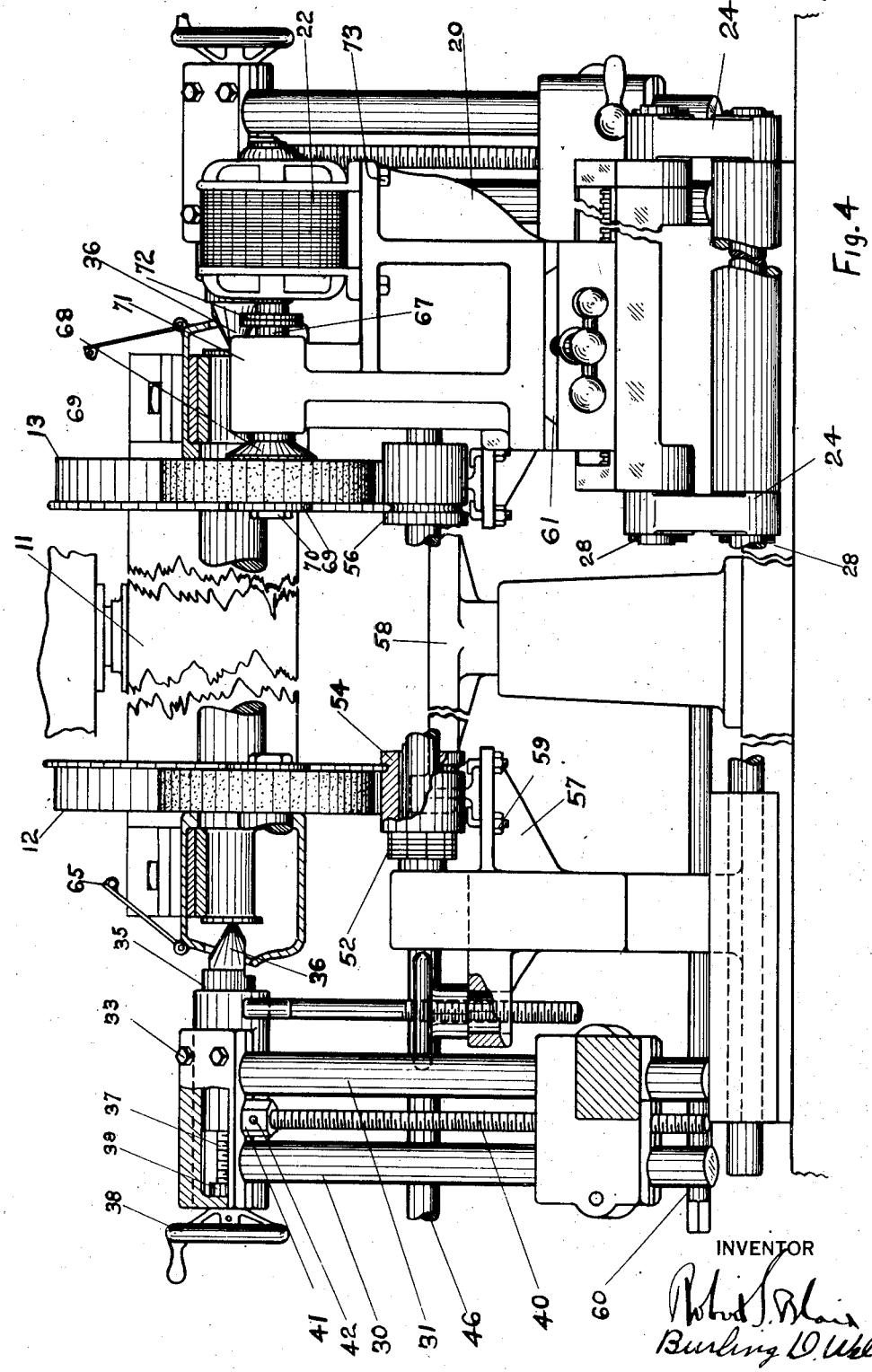

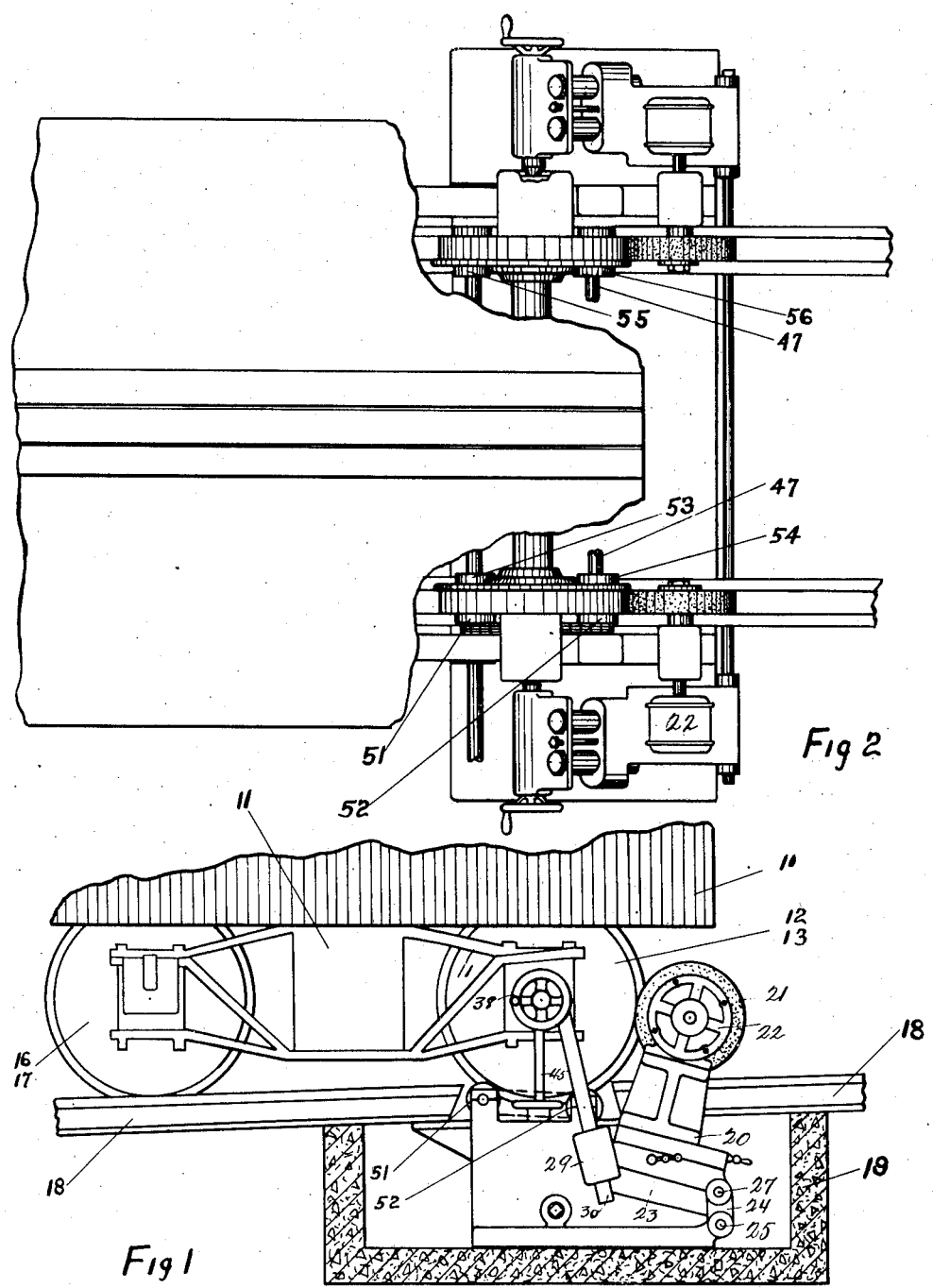

May 3, 1927.

R. S. BLAIR ET AL 1,627,074

APPARATUS FOR TRUING CAR WHEELS

Filed May 13, 1921   3 Sheets-Sheet 3

INVENTOR
Robert S. Blair
Burling D. Wells

Patented May 3, 1927.

1,627,074

UNITED STATES PATENT OFFICE.

ROBERT S. BLAIR, OF SOUND BEACH, AND BURLING D. WELLS, OF DANBURY, CONNECTICUT; SAID WELLS ASSIGNOR TO SAID BLAIR.

APPARATUS FOR TRUING CAR WHEELS.

Application filed May 13, 1921. Serial No. 469,154.

This invention relates to car wheels and more particularly to the truing of the surfaces thereof.

One of the objects thereof is to provide apparatus of practical construction whereby the tread of car wheels may be trued without removal of the wheel from the truck. Another object is to provide apparatus of the above type of accurate and dependable action and simple and reliable construction. Other objects will be in part obvious and in part pointed out hereinafter.

The invention accordingly consists in the features of construction, combinations of elements, and arrangements of parts all as will be illustratively herein described and the scope of the application of which will be indicated in the following claims.

In the accompanying drawing in which is shown one of various possible embodiments of the several features of this invention, Figure I is a diagrammatic side elevation of a railway car truck and the adjacent portion of the car body, the left hand wheels of which truck are resting on the rails while the right hand pair of wheels is resting upon the driving rails of the wheel truing apparatus.

Figure II is a diagrammatic plan view of the apparatus shown in Figure IV showing the two grinding heads and centering devices of the truing apparatus.

Figure III is a side elevation of the truing apparatus shown in Figures I and II being substantially an enlarged view of the truing apparatus as shown in Figure I.

Figure IV is a right hand elevation of the truing apparatus shown in Figure II having a truck in position for truing one of its pairs of wheels.

Turning now to Figure I we have at 10 a car the right hand truck 11 which has its right hand pair of wheels 12 and 13 resting upon the driving rolls of the apparatus for truing car wheels. The left hand pair of wheels 16 and 17 of the truck 11 rest upon the track 18 and are free to move either to the right or left in any degree such as is necessitated by reason of the right hand wheels 12 and 13 being out of round and consequently tending to move slightly about their true axes as they revolve upon the driving rolls. The apparatus for truing car wheels is placed in a suitable pit which is lined with a concrete wall 19 which in conjunction with brackets integral with the frame of the apparatus for truing car wheels rigidly supports the track 18.

Turning now to Figure III we have a compound slide rest 20 which carries an abrasive wheel 21 direct connected to an electric motor 22. This compound slide rest 20 is gibbed into the bed plate 23 the right hand end of which is supported by links 24, the lower end of which link passes around a bar 25 which runs across the front of the entire main bed plate 26 and passes through lugs integral therewith, at the upper end of the link 24 pin 27 is passed through it and the bed plate 23. The holes in the ends of the links 24 are made a running fit upon the bolt 25 and the pin 27; the links 24 are retained thereon by split pins such as 28.

At the left hand end of the bed plate 23 there is located a boss 29 which has two bars 30 and 31 passing through holes in it and has a clamping screw 32 threaded into it in such a way that when the clamping screw 32 is screwed in tightly the bars 30 and 31 are securely gripped by the boss 29. Boss 29 is provided with a slot located in the plane of the center lines of the two bars 30 and 31, thus the boss 29 becomes a clamp which whenever clamping screw 32 is drawn up will securely grip the two bars 30 and 31. Fastened to the upper ends of the bars 30 and 31 in a similar manner by the screws such as 33 is the bracket 34 splined into which is a sliding member 35 which is provided with a recess on its right hand end holding a lathe center 36, the other end of the sliding member 35 is threaded on to the center adjusting screw 37, the center adjusting screw 37 in turn has pinned on to it on its exterior end a hand wheel 38. The center adjusting screw 37 is restrained from relative axial movement with the bracket 34 by the collar 39 which is integral with the center adjusting screw 37 and abuts against the end of the recess in the bracket 34 in which the sliding member 35 is located. Threaded into the boss 29 between the two bars 30 and 31 is an adjusting screw 40, the upper end of which passes through the bracket 34 and is provided with a square or hexagon head which abuts against the upper surface of the bracket 34 and a collar 41 bearing against the lower surface of the bracket 34 and pinned on to the adjusting screw 40 by a pin 42 preventing motion of the adjusting screw 40 in an axial direction relative to the bracket 34. The adjusting screw 40 is free to turn in the bracket 34 and serves as a means for adjusting the amount by which the bars 30 and 31 project beyond the boss 29 on the bed plate 23. A bracket 43 on the side of the main bed plate 26 and integral therewith is provided with a hole in which is journaled an adjusting nut 44 which is provided with a shoulder which bearing upon the upper surface of the bracket 43 serves as a thrust bearing to take up all thrust transmitted to it by the center support 45 which is threaded into the adjusting nut 44 and at its upper end is forked to conform with the lower surface of the bracket 34 thus effectively serving as a support for the bracket 34 and all the mechanism connected therewith, at the same time affording a means of raising or lowering the bracket 34 so that the lathe center 36 will be in line with the center in the ends of the axle of the pair of wheels which it is desired to true up in this apparatus. The adjusting nut 44 has its upper end expanded into a hand wheel with a rim which is suitable for being gripped with some form of a spanner wrench, thus making it possible to turn the same with but small effort on the part of the operator of this apparatus. A pair of shafts 46 and 47, so arranged that their center lines are parallel to a line passing between the tips of the lathe centers 36, are journaled in bearings 48 and 49 mounted on the main bed plate 26 as shown in Figures III and IV. The shaft 46 is extended so as to facilitate connection with some exterior source of power and is connected to the parallel shaft 47 by means of a chain 50 which runs on sprockets 51 and 52 arranged on the respective shafts 46 and 47. Splined on to the parallel shafts 46 and 47 in the position as shown in Figure IV are two driving rolls 53 and 54 which are provided with grooves in their circumferences which are adapted to receive the flanges of the wheels which are being trued up in the apparatus and are substantially "V" shaped in cross section to afford a maximum of driving power and are of such depth as to support the wheels with their treads clear of the surface of the driving rolls. Driving rolls 53 and 54 being splined on their respective shafts are capable of relative axial movement therewith, thus permitting pairs of car wheels of slightly different distances between their respective flanges to rest firmly in the grooves of the driving rolls 53 and 54 although the corresponding driving rolls 55 and 56 upon which the other wheel rests are securely fastened to the shafts 46 and 47. A rail supporting bracket 57 integral with the main bed plate 26 has the ends of the track 18 where a section has been cut out of it to permit the apparatus for truing car wheels to be lined up with the track so that when the wheels roll off from the ends of the track on to the wheel supporting jack 58 and upon said jack being lowered so that the car wheel flanges will drop directly into the grooves in the circumference of the rolls 53, 54, 55 and 56, the ends of the track at the gap are secured to the rail supporting bracket 57 by bolts such as 59. The jack 58 is mounted upon the main bed plate 26 at a point midway between the pair of wheels which are to be trued and directly below the center of their axle and serves as a medium for transferring the weight of the car wheels 12 and 13 gradually to the driving rolls 53, 54, 55 and 56, thus avoiding any damage to the mechanism which might occur due to the sudden dropping of the car wheels 12 and 13 from the ends of the track 18 down on to the driving rolls 53, 54, 55 and 56 when the car is being shifted to the proper position for performing the truing operation. The jack 58 has an extension shaft 60 which extends to some convenient place and has at its outer end a square section suitable for receiving a wrench or hand wheel, thus enabling the operator to raise or lower the jack at will. The compound slide rest 20 is mounted upon a cross slide 61 which is arranged to cause the grinding wheel 21 and the driving mechanism to approach or recede from the surface of the car wheel 13 upon the hand wheel 62 being turned in an appropriate direction. Cross slide 61 is in turn mounted upon a longitudinal slide 63 which upon the hand wheel 64 being turned in the proper direction will cause the grinding wheel 21 and its driving mechanism to advance across the face of the tread of the car wheel 13. Figure IV shows a pair of car wheels 12 and 13 mounted in the car wheel truing apparatus in proper position for beginning the operation of truing up their treads. The cover plates 65 and 66 over the opening in the end of the journal boxes of the car truck 11 have been swung upward permitting the centers 36 to be run in through the opening and engage with the center in the end of the axle of the wheels 12 and 13 as shown. The grinding wheel 21 is secured on a shaft 67 between a pair of flanges 68 and 69 by the nut 70, shaft 67 being journaled in bearing 71 and connected to the driving motor 22 by means of the coupling 72. The motor 22 is secured to the compound slide rest 20 by bolts such as 73 and consequently as the compound slide rest 20 is moved about the grinding wheel 21 and its attached driving motor 22 will move as a unit; the application of the driving motor 22 directly to the grinding wheel 21 avoids the use of the more conventional pulleys and belting and permits a construction of a very compact machine which is essential as it is all located below the track 18 in the pit. As the machine above described consists of two similar mechanisms grouped together, it is to be understood that when any part of one is described that the similar part is to be found in the other and functions in a like manner and consequently throughout the above description one mechanism only has been described.

The operation of the car wheel truing apparatus is substantially as follows: A car such as 10 the wheels of which it is desired to true, is run on to the track 18 and the jack 58 having been raised until its top is in line with the top of the track 18, the car 10 is pushed over so that the center line of the pair of wheels which it is desired to true up is midway between the driving rolls 53, 54, 55 and 56. Before the car 10 is shunted into the position above described, it is essential that the lathe centers 36 shall be withdrawn so as not to interfere with the ends of the journal boxes of the car truck 11 and that the grinding wheel 21 be withdrawn on its longitudinal slide sufficiently to clear the ends of the journal boxes also, and the bracket 34 will be supported by the center support 45. The car 10 now having been rolled into position so that the center and the end of the axle of the wheels 12 and 13 are approximately in line with the lathe centers 36, the jack 58 is now lowered by the operator revolving the shaft 60 by means of a suitable wrench or hand wheel which is not shown in the drawing, until the car wheels 12 and 13 rest in the grooves in the circumference of the driving rolls 53, 54, 55 and 56 and is further lowered to clear the wheels as they revolve when their surfaces are being trued up. The adjusting nut 44 on the center support 45 is now revolved so as to raise or lower the bracket 34 until the lathe centers 36 closely line up with the center in the end of the axle of the wheels 12 and 13 upon which alignment having been attained the hand wheel 38 is turned feeding the sliding member 35 in until the center remounted therein engages with the center in the end of an axle of the car wheels 12 and 13. The lathe center 36 having been firmly pushed home the center support 45 is now lowered by turning the adjusting nut 44 until the upper end clears the bottom of the bracket 34 and the bed plate 23 carrying the compound slide rest 20 and the grinding wheel 21 and its driving mechanism are now supported by the lathe center 36 and by the links 24. From the above it will be seen that no matter how out of round the tread of the car wheels 13 and 12 may be, that as they revolve upon the driving rolls 53, 54, 55 and 56 and their centers move correspondingly due to the non-uniform radius of curvature of the wheels 12 and 13, that the bed plate 23 and the compound slide rest mounted thereon are free to move about as necessitated by the movement of the center of the wheels 12 and 13.

Turning to Figure III it will be seen that the grinding wheel 21 and the lathe centers 36 are mounted on the same rigid member and therefore no matter what degree of relative movement exists between the geometric centers of the wheels 12 and 13 and the bed plate 26 the distance between the geometric center of the wheels 12 and 13 and that of the grinding wheel 21 will always remain constant having once been set. This distance between the centers of the grinding wheel 20 and the car wheels 12 and 13 may be varied at will by the operator of the machine by manipulating the various adjustments provided both for adapting the machine for handling different diameters of car wheels and for feeding in the grinding wheel 21 as it grinds away the treads of the car wheels 12 and 13 upon which it may be acting. The two car wheels 12 and 13 and their axle having been mounted in the apparatus for truing car wheels on the lathe centers 36 and the apparatus appearing as shown in Figure III the operator will now turn the hand wheel 62 withdrawing the grinding wheel 21 away from the center of the car wheels 12 and 13 to a sufficient extent that he may by revolving the hand wheel 23 move the grinding wheel 21 across the face of the car wheels 12 and 13 until the face of the grinding wheel 21 is in alignment with the tread of the car wheels 12 and 13 upon which adjustment having been obtained he is now prepared to go on with the process of truing up the car wheels which are now mounted in the apparatus. Shaft 46 is set in clockwise rotation as shown in Figure III by some source of power external to the apparatus. Shaft 48 in turning drives shaft 47 through the chain 50 engaging with sprockets 51 and 52 mounted upon them. Driving rolls 53 and 54 splined on the shafts 46 and 47 respectively and the driving rolls 55 and 56 also keyed on said shafts, by virtue of their rotation in a clockwise direction, set the car wheels 12 and 13 resting thereon in anti-clockwise rotation by virtue of the treads of the car wheels 12 and 13 frictionally engaging with the grooves in the circumferences of the driving rolls, 53, 54, 55 and 56. The direction of rotation of the various parts as described above is as indicated by the arrows on the various members as shown in Figure III. The grinding wheel 21 is now set in anti-clockwise rotation by applying electric current to the motor 22 and upon the grinding wheel 21 having reached its proper working speed the operator feeds it in towards the treads of the car wheels 12 and 13 by revolving the hand wheel 62 and continues to feed the grinding wheel 21 inward until a true, smooth and suitable surface has been obtained on the treads of the car wheels 12 and 13. The treads of the car wheels 12 and 13 having been ground to a satisfactory surface and their diameters having been made equal, the operator will withdraw the grinding wheel 21 away from the tread of the car wheel upon which it has been working by revolving the hand wheel 62 and having cut off the power from the driving member 22 and from the shaft 46 he will by revolving the hand wheel 23 withdraw the compound slide rest 20 and the grinding wheel 21 and the driving motor 22 mounted thereon well out from the path of the car truck 11 so that it will not be struck by the ends of the journal boxes of the truck 11 when the car 10 is moved so as to place another pair of its wheels in position for grinding, simultaneously moving the pair of car wheels which have just been finished out of the apparatus for truing car wheels. To roll the wheels 12 and 13 from the apparatus for truing car wheels the operator elevates the jack 58 by revolving the shaft 60 by means of a hand wheel or wrench in the proper direction until the jack 58 comes into contact with the lower part of the treads of the car wheels 12 and 13 and elevates them off the driving rolls 53, 54, 55 and 56 until they are on the same level as the top of the track 18, then the lathe centers 36 are withdrawn from the centers in the ends of the axle of the car wheels 12 and 13 by revolving the hand wheel 38 in the proper direction, the center support 45 having been elevated to support the bracket 34 and the mechanism connected thereto by revolving the hand wheel 44 as the lathe centers 36 are withdrawn. The car 10 may now be shunted along the track 18 so as to bring another pair of its wheels into position on the apparatus for truing car wheels. Because of design of various types of car trucks it may be necessary to turn the car around upon a turntable or by means of some equivalent device before being able to mount the second pair of car wheels of any truck in the apparatus for truing car wheels after the first pair has been trued up. Some car trucks are provided with brakes bearing against the outside treads of the wheels in which case in order to true up the wheels of such a truck it will be necessary to remove the brake rigging as the apparatus for truing car wheels as described herein is designed for app'ying the grinding wheel to this part of the car wheel, car trucks which are provided with brake shoes bearing upon the adjacent surfaces of the treads of the car wheels can have their wheel treads trued up in this appartus without disturbing the brake rigging. From the above description of the apparatus and the process involved in the truing up of the treads of a pair of car wheels it will be seen that the grinding wheel 21 as shown in Figure IV may have a width of face equal to that of the width of the tread of the car wheels 12 and 13, such being the case it will be necessary for the operator only to feed the wheel in towards the center of the axle of the car wheels 12 and 13 as the high spots on their treads are ground off and a true, symmetrical surface is approached. It may be desirable to use a grinding wheel 21 having such a width of face as to make possible the forming of the face of the wheel by truing it by means of a diamond truing tool to conform to the tread and flange of the car wheel which it is desired to true up, thus in one operation the tread and its flange may be restored to its original form as manufactured. As will be seen in Figure IV the apparatus for truing car wheels is provided with a pair of compound slide rests such as 20 which have mounted thereon a grinding wheel such as 21 and a driving motor therefor such as 22, thus making possible the truing up of both car wheels mounted upon any axle of a car truck which may be mounted in the apparatus above described.

From the above it will be seen that a lathe tool may be substituted for a grinding wheel 21 whenever the apparatus is used for truing up either cast iron car wheels with unchilled treads or soft steel car wheels; either a plain lathe tool such as is commonly used in truing up cylindrical objects in an ordinary metal working lathe or a wide forming tool shaped to conform to the finished surface of the tread of the wheel and its flange may be made use of.

As various changes might be made in the illustrative apparatus above described, it is to be understood that all matter herein set forth or shown in the accompanying drawings is to be interpreted as illustrative and not in a limiting sense.

We claim:

1. In apparatus for truing car wheels and the like, in combination, means adapted to rotate a car wheel in a stationary truck, a truing device adapted to coact with the tread of said wheel, means mounting said truing device at a predetermined distance from the axis of said wheel and maintaining said distance irrespective of bodily movement of said wheel, and means adapted to feed said device toward said axis.

2. In apparatus for truing car wheels and the like, in combination, means adapted to support the wheel by its lower portion, means adapted to engage the center in the axle of the wheel, and truing means held at a predetermined distance from said centering means and adapted to co-act with the tread of the wheel and formed to swing about the axis of the wheel upon bodily movement of the latter, and means adapted to rotate the wheel.

3. In apparatus for truing car wheels and the like, in combination, means adapted to support the wheel by its lower portion, means adapted to engage the center in the axle of the wheel, and truing means held at a predetermined distance from said centering means irrespective of bodily movement of the wheel and adapted to co-act with the tread of the wheel, means adapted to rotate the wheel and means adapted to vary said distance and thereby feed said truing means toward the wheel.

4. In apparatus for truing car wheels and the like, in combination, a pair of rails, a pair of supports independent of said rails to which said rails lead and positioned and adapted to receive the wheels of a truck traveling from said rails thereonto, means adapted to rotate a pair of wheels upon said support, and truing means adapted to co-act with said rotating wheels.

5. In apparatus for truing car wheels and the like, in combination, means adapted to support a car wheel in a truck, means adapted to rotate the wheel thus supported, truing means coacting with the tread of said wheel, and means holding said truing means at a predetermined distance from the axis of said wheel and swinging about said axis upon bodily movement of the wheel.

6. In apparatus for truing car wheels and the like, in combination, rotary means adapted to support a car wheel in a truck, means adapted to rotate the wheel thus supported by rotating said supporting means, truing means coacting with the tread of said wheel, means holding said truing means at a predetermined distance from the axis of said wheel, and means adapted to vary said distance.

7. In apparatus for truing car wheels and the like, in combination, means adapted to rotate a car wheel in a stationary truck, a truing device coacting with the tread of said wheel, means holding said truing device at a predetermined distance from the axis of said wheel irrespective of bodily movement of this wheel, and means adapted to remove said truing device from the path of said wheel.

8. In apparatus for truing car wheels and the like, in combination, a pair of rails, a pair of rotary supporting devices adapted to receive the pair of wheels of a truck traveling from said rails, means adapted to rotate said devices and thereby rotate said wheels, a pair of truing devices held at a predetermined distance from the axis of said wheels by means engaging the centers at the ends of the axle thereof, means adapted to feed said truing devices toward the wheels and means adapted to remove said truing devices from the path of said wheels.

9. In apparatus for truing car wheels and the like, in combination, a rail, a rotary support adapted to receive a car wheel traveling in a truck from said rail, a truing device adapted to co-act with the tread of a wheel on said support, means adapted to rotate said wheel, means adapted to hold said truing device at a fixed distance from the axis of said wheel by engagement with the center of the end of its axle and means adapted to remove said truing device from the path of said wheel.

10. In apparatus for truing car wheels and the like, in combination, means adapted to rotate a car wheel and axle in a stationary truck, a truing device, means mounting said truing device in connection with a portion of said axle concentric to the axis thereof and permitting said truing device to swing about said axis in a concentric path, and means adapted to vary at will the distance between the actuating portion of said truing device and said axis.

11. In apparatus for truing car wheels and the like, in combination, means adapted to rotate a car wheel and axle in a stationary truck by driving said wheel from the outer portion thereof, a grinding wheel adapted to be driven at a relatively high speed and adapted to coact with the tread of said wheel, means adapted to feed said grinding wheel toward and away from the axis of said car wheel, and means adapted to drive said grinding wheel at a high speed and permit said feeding movement.

12. In apparatus for truing car wheels and the like, in combination, a rail, a pair of rollers adapted and positioned to receive a car wheel passing from said rail, means adapted to rotate said car wheel through one of said rollers, a truing device, means connecting said truing device with a portion of the axle of said wheel concentric with respect to its axis and adapted to hold said truing device at a predetermined distance from said axis, and means adapted to vary said distance at will.

13. In apparatus for truing car wheels and the like, in combination, a car wheel and axle, means adapted to rotate the same in a stationary truck, a supporting device engaging the centers at each end of said axle and extending outwardly from said axle and thence transversely across the truck, a truing device mounted upon said supporting device to coact with the tread of the wheel and thereby held at a predetermined distance from the axis of said wheel, and means adapted to feed said truing device toward or away from the wheel.

Signed at Stamford, in the county of Fairfield and State of Connecticut, this 7th day of May, A. D. 1921.

ROBERT S. BLAIR.
BURLING D. WELLS.